(12) United States Patent
Spinks et al.

(10) Patent No.: US 12,634,600 B2
(45) Date of Patent: May 19, 2026

(54) IMAGE SENSORS WITH REDUCED FIXED PATTERN NOISE

(71) Applicant: SEMICONDUCTOR COMPONENTS INDUSTRIES, LLC, Scottsdale, AZ (US)

(72) Inventors: Stephen James Spinks, Shrivenham (GB); Nicholas Paul Cowley, Wroughton (GB); Andrew David Talbot, Chieveley (GB)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 43 days.

(21) Appl. No.: 18/921,434

(22) Filed: Oct. 21, 2024

(65) Prior Publication Data

US 2026/0113548 A1    Apr. 23, 2026

(51) Int. Cl.
*H04N 25/677* (2023.01)
*H04N 25/78* (2023.01)

(52) U.S. Cl.
CPC ........... *H04N 25/677* (2023.01); *H04N 25/78* (2023.01)

(58) Field of Classification Search
CPC ...... H04N 25/677; H04N 25/78; H04N 25/67; H04N 25/672; H04N 25/76
See application file for complete search history.

(56) References Cited

U.S. PATENT DOCUMENTS

| | | | | |
|---|---|---|---|---|
| 9,635,250 B2 * | 4/2017 | Sato | ........................ | H04N 25/46 |
| 9,848,152 B1 * | 12/2017 | Lin | ...................... | H03M 1/0639 |
| 10,506,182 B2 * | 12/2019 | Izuha | ...................... | H04N 25/77 |
| 12,212,872 B2 * | 1/2025 | Sato | .................. | H10F 39/80373 |
| 2011/0147875 A1 | 6/2011 | Parks et al. | | |
| 2011/0261233 A1 | 10/2011 | Zhang et al. | | |
| 2013/0321671 A1 | 12/2013 | Cote et al. | | |
| 2017/0064231 A1 | 3/2017 | Blanquart | | |
| 2018/0184022 A1 * | 6/2018 | Johansson | ............ | H04N 25/618 |

(Continued)

OTHER PUBLICATIONS

Min-Kyu Kim et al., A Fast Multiple Sampling Method for Low-Noise CMOS Image Sensors With col. Parallel 12-bit SAR ADCs, Sensors, Dec. 26, 2015, p. 27, vol. 16.

(Continued)

*Primary Examiner* — Kelly L Jerabek
(74) *Attorney, Agent, or Firm* — Slayden Grubert Beard PLLC

(57)    ABSTRACT
An imaging system may include an image sensor with an array of pixels arranged in rows and columns. Row driver circuitry may be coupled to the pixels and may address a given row of the pixels based on a row address. Row randomization circuitry may be coupled to the row driver circuitry to dither the row address and therefore randomize the order in which rows of a given column are read out over column lines to sample and hold circuitry that includes a plurality of capacitors for each column. The imaging system may include a multiplexer that de-randomizes the order of the rows after passing through the sample and hold circuitry. Alternatively or additionally, the order in which the plurality of capacitors is used to store the signals from each column may be randomized. In this way, fixed pattern noise in an output image may be reduced or eliminated.

20 Claims, 7 Drawing Sheets

(56)        References Cited

U.S. PATENT DOCUMENTS

| | | | |
|---|---|---|---|
| 2020/0084397 A1* | 3/2020 | Yamazaki | H04N 25/701 |
| 2022/0132068 A1* | 4/2022 | Soda | H04N 25/134 |

OTHER PUBLICATIONS

Gabor Szedo Becker et al., Uniformity Correction of CMOS Image Sensor Modules for Machine Vision Cameras, Sensors, Nov. 4, 2022, p. 9733, vol. 22, No. 4.
Hussein Ali et al., Single-Ended-to-Differential Sampling Technique for Sigma Delta ADCs in X-Ray Detectors, IEEE 62nd International Midwest Symposium on Circuits and Systems (MWSCAS), Aug. 4, 2019, Dallas, USA.

* cited by examiner

| ROW | FRAME | | | | | | | | | | | |
| --- | M | | | M+1 | | | M+2 | | | etc |
| | R | S | delta | R | S | delta | R | S | delta | |
| N | C3 | C1 | dC1-dC3 | C2 | C1 | dC1-dC2 | C3 | C2 | dC2-dC3 | C3 |
| N+1 | C2 | C3 | dC3-dC2 | C3 | C2 | dC2-dC3 | C1 | C3 | dC3-dC1 | C2 |
| N+2 | C1 | C2 | dC2-dC1 | C1 | C3 | dC3-dC1 | C2 | C1 | dC1-dC2 | C1 |
| N+3 | C3 | C1 | dC3-dC1 | C2 | C1 | dC1-dC2 | C3 | C2 | dC2-dC3 | C3 |
| N+4 | C2 | C3 | dC3-dC2 | C3 | C2 | dC2-dC3 | C1 | C3 | dC3-dC1 | C2 |
| N+5 | C1 | C2 | dC2-dC1 | C1 | C3 | dC3-dC1 | C2 | C1 | dC1-dC2 | C1 |
| etc | C3 | C1 | dC3-dC1 | C2 | C1 | dC1-dC2 | C3 | C2 | dC2-dC3 | C3 |

FIG. 7

IMAGE SENSORS WITH REDUCED FIXED PATTERN NOISE

BACKGROUND

Image sensors are commonly used in electronic devices such as cellular telephones, cameras, computers, and automobiles to capture images. In a typical arrangement, an image sensor includes an array of image pixels arranged in pixel rows and pixel columns. Circuitry may be coupled to each pixel column for reading out image signals from the image pixels. It is within this context that the embodiments described herein arise.

BRIEF DESCRIPTION OF THE DRAWINGS

FIG. 7 is a table of an illustrative randomized pattern used to sample and hold pixels signals in accordance with some embodiments.

DETAILED DESCRIPTION

Embodiments of the present technology relate to image sensors. It will be recognized by one skilled in the art that the present exemplary embodiments may be practiced without some or all of these specific details. In other instances, well-known operations have not been described in detail in order not to unnecessarily obscure the present embodiments.

Electronic devices such as digital cameras, computers, cellular telephones, and other electronic devices may include image sensors that gather incoming light to capture an image. The image sensors may include arrays of pixels. The pixels in the image sensors may include photosensitive elements such as photodiodes that convert the incoming light into image signals. Image sensors may have any number of pixels, such as hundreds or thousands or more. A typical image sensor may, for example, have hundreds or thousands or millions of pixels. One million pixels may be referred to as a megapixel. Image sensors may include control circuitry such as circuitry for operating the pixels and readout circuitry for reading out image signals corresponding to the electric charge generated by the photosensitive elements.

Signals generated by the pixels may be read out over column lines. Sample and hold circuitry may sample and hold the signals, and the signals may be converted to digital signals and output from the readout circuitry. The sample and hold circuitry may be shared between columns of pixels and may include multiple capacitors to store and read out the signals and resets for each column. Due to parasitic differences in these multiple capacitors, row fixed pattern noise may be present in the output image if pixels are read out the same way in each image frame. Therefore, to reduce or eliminate row fixed pattern noise, the rows may be randomized (e.g., pseudorandomized) in their order of readout and/or the capacitors used to store the signal and reset values may be randomized (e.g., pseudorandomized).

Figure 1:
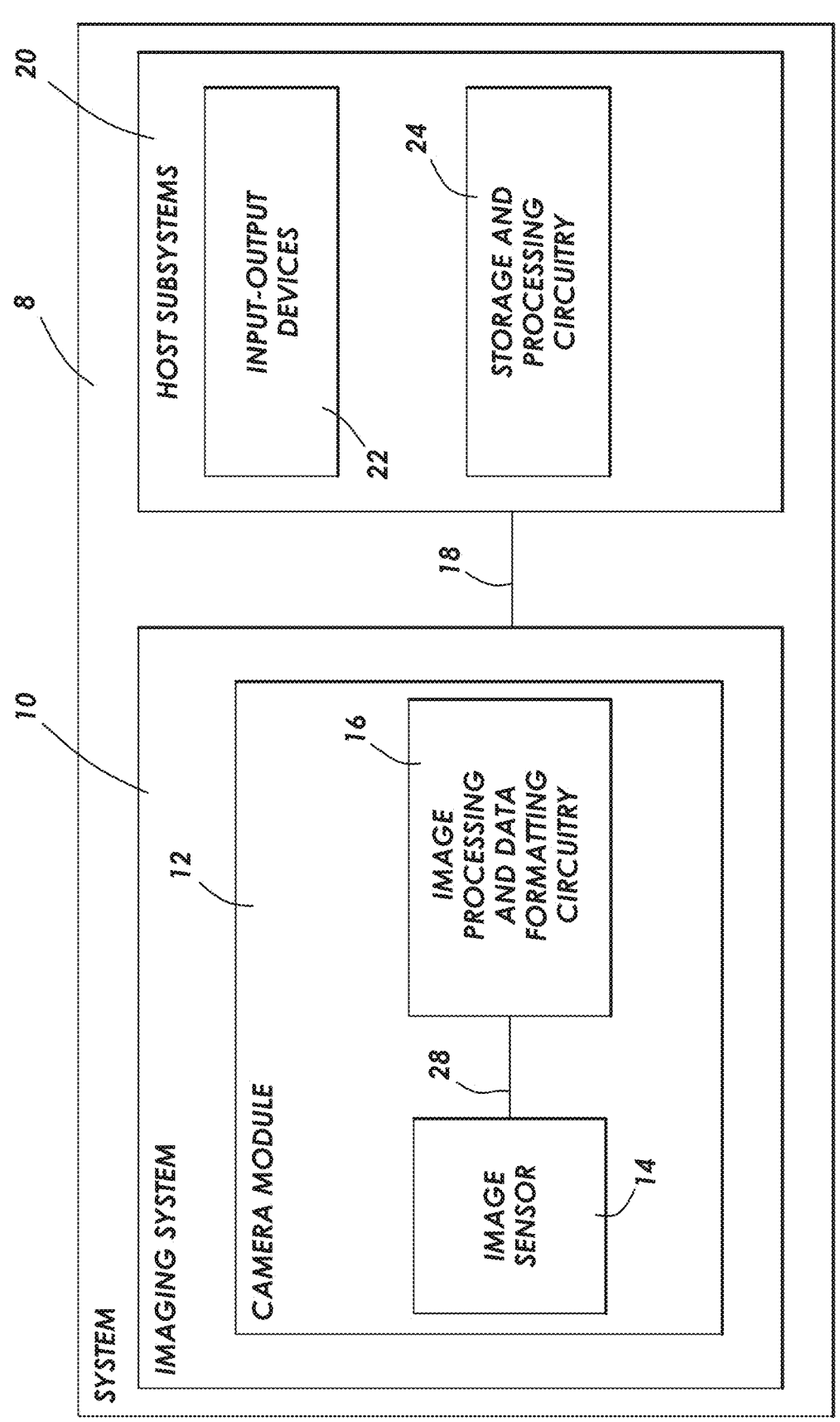
FIG. 1 is a diagram of an illustrative electronic device having an image sensor in accordance with some embodiments.

FIG. 1 is a diagram of an illustrative imaging and response system including an imaging system that uses an image sensor to capture images. System 8 of FIG. 1 may be an electronic device such as a camera, a cellular telephone, a video camera, or other electronic device that captures digital image data, may be a vehicle safety system (e.g., an active braking system or other vehicle safety system), or may be a surveillance system, as examples.

As shown in FIG. 1, system 8 may include an imaging system such as imaging system 10 and host subsystems such as host subsystem 20. Imaging system 10 may include camera module 12. Camera module 12 may include one or more image sensors 14, such as in an image sensor array integrated circuit, and one or more lenses. During image capture operations, each lens may focus light onto an associated image sensor 14. Image sensor 14 may include photosensitive elements (e.g., image sensor pixels) that convert the light into analog data. Image sensors may have any number of pixels, such as hundreds, thousands, millions, or more. A typical image sensor may, for example, have millions of pixels (e.g., megapixels).

Each image sensor in camera module 12 may be identical or there may be different types of image sensors in a given image sensor array integrated circuit. In some examples, image sensor 14 may further include bias circuitry (e.g., source follower load circuits), sample and hold circuitry, correlated double sampling (CDS) circuitry, amplifier circuitry, analog-to-digital converter circuitry, data output circuitry, memory (e.g., buffer circuitry), and/or address circuitry.

Still and video image data from image sensor 14 may be provided to image processing and data formatting circuitry 16 via path 28. Image processing and data formatting circuitry 16 may be used to perform image processing functions such as data formatting, adjusting white balance and exposure, implementing video image stabilization, or face detection. Image processing and data formatting circuitry 16 may additionally or alternatively be used to compress raw camera image files if desired, such as compressing the raw camera image files to Joint Photographic Experts Group (JPEG) format.

In one example arrangement, such as a system on chip (SoC) arrangement, image sensor 14 and image processing and data formatting circuitry 16 are implemented on a common semiconductor substrate, such as a common silicon image sensor integrated circuit die. If desired, however, image sensor 14 and image processing and data formatting circuitry 16 may be formed on separate semiconductor substrates. For example, image sensor 14 and image processing and data formatting circuitry 16 may be formed on separate substrates that have been stacked.

Imaging system 10 may convey acquired image data to host subsystem 20 over path 18. Host subsystem 20 may include input-output devices 22 and storage and processing circuitry 24. Host subsystem 20 may include processing software for detecting objects in images, detecting motion of objects between image frames, determining distances to objects in images, or filtering or otherwise processing images provided by imaging system 10. For example, image processing and data formatting circuitry 16 of imaging system 10 may communicate the acquired image data to storage and processing circuitry 24 of host subsystems 20.

If desired, system 8 may provide a user with numerous high-level functions. In a computer or cellular telephone, for example, a user may be provided with the ability to run user applications. For these functions, input-output devices 22 of host subsystem 20 may include keypads, input-output ports, buttons, and displays and storage and processing circuitry 24. Storage and processing circuitry 24 of host subsystem 20 may include volatile and/or nonvolatile memory (e.g., random-access memory, flash memory, hard drives, and/or solid-state drives). Storage and processing circuitry 24 may additionally or alternatively include microprocessors, microcontrollers, digital signal processors, and/or application specific integrated circuits.

Figure 2:
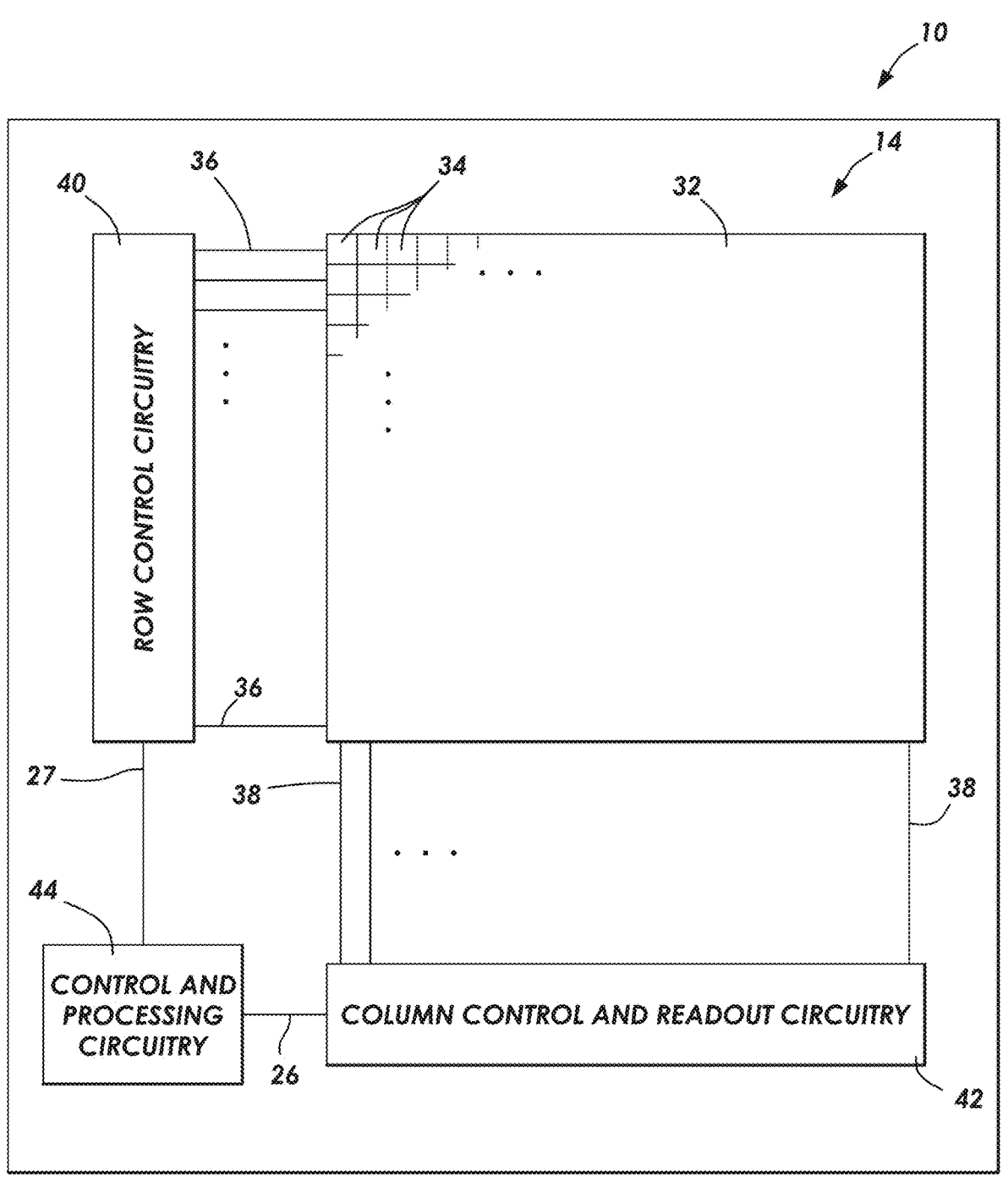
FIG. 2 is a diagram of an illustrative pixel array and associated row and column control circuitry for reading out image signals from an image sensor in accordance with some embodiments.

An example of an arrangement of image sensor 14 of FIG. 1 is shown in FIG. 2. As shown in FIG. 2, image sensor 14 may include control and processing circuitry 44. Control and processing circuitry 44 (sometimes referred to as control and processing logic herein) may be part of image processing and data formatting circuitry 16 in FIG. 1 or may be separate from image processing and data formatting circuitry 16. Image sensor 14 may include a pixel array such as array 32 of pixels 34 (sometimes referred to herein as image sensor pixels, imaging pixels, or image pixels). Control and processing circuitry 44 may be coupled to row control circuitry 40 via control path 27 and may be coupled to column control and readout circuitry 42 via data path 26.

Row control circuitry 40 may receive row addresses from control and processing circuitry 44 and may supply corresponding row control signals to image pixels 34 over one or more control paths 36. The row control signals may include pixel reset control signals, charge transfer control signals, blooming control signals, row select control signals, dual conversion gain control signals, and/or any other desired pixel control signals.

Column control and readout circuitry 42 may be coupled to one or more of the columns of pixel array 32 via one or more conductive lines such as column lines 38. A given column line 38 may be coupled to a column of image pixels 34 in image pixel array 32 and may be used for reading out image signals from image pixels 34 and for supplying bias signals (e.g., bias currents or bias voltages) to image pixels 34. Alternatively, a single column line 38 may be coupled to multiple columns of pixel array 32, or multiple column lines 38 may be coupled to a single column of pixel array 32. In some examples, each column of pixels may be coupled to a corresponding column line 38. For image pixel readout operations, a pixel row in image pixel array 32 may be selected using row control circuitry 40, and image data associated with image pixels 34 of that pixel row may be read out by column control and readout circuitry 42 on column lines 38. Column control and readout circuitry 42 may include column circuitry such as column amplifiers for amplifying signals read out from array 32, sample and hold circuitry for sampling and storing signals read out from array 32, analog-to-digital converter circuits for converting read out analog signals to corresponding digital signals, and/or column memory for storing the readout signals and any other desired data. Column control and readout circuitry 42 may output digital pixel readout values to control and processing circuitry 44 over data path 26.

Array 32 may have any number of rows and columns. In general, the size of array 32 and the number of rows and columns in array 32 will depend on the particular implementation of image sensor 14. While rows and columns are generally described herein as being horizontal and vertical, respectively, rows and columns may refer to any grid-like structure. Features described herein as rows may be arranged vertically and features described herein as columns may be arranged horizontally.

Pixel array 32 may be provided with a color filter array having multiple color filter elements which allows a single image sensor to sample light of different colors. As an example, image sensor pixels such as the image pixels in array 32 may be provided with a color filter array which allows a single image sensor to sample red, green, and blue (RGB) light using corresponding red, green, and blue image sensor pixels. The red, green, and blue image sensor pixels may be arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another example, broadband image pixels having broadband color filter elements (e.g., clear color filter elements) may be used instead of green pixels in a Bayer pattern. These examples are merely illustrative and, in general, color filter elements of any desired color (e.g., cyan, yellow, red, green, or blue) and in any desired pattern may be formed over any desired number of image pixels 34. Alternatively or additionally, image pixels 34 may be sensitive to infrared wavelengths (or other suitable wavelengths) and may be provided with filter elements that correspond with those wavelengths.

The sample and hold circuitry in column control and readout circuitry 42 may include multiple capacitors (e.g., six capacitors) for each set of two columns of pixel array 32. For example, column control and readout circuitry 42 may include three capacitors for an even output column and three capacitors for an odd output column. Including three capacitors (or another suitable number of capacitors) for each column readout may allow for the reset and the signal for each column to be sampled and held on two of the capacitors, while the remaining capacitor may be pre-charged to a fixed level to remove any residual charge from the previous row. By reading out the columns in this way, signals from multiple rows may be read out in series over a single parallel read.

However, if the sample and hold cycles through a pattern that repeats every three rows (e.g., due to the repeating pattern sample and hold pattern of the three capacitors for each column), any mismatches (e.g., non-idealities) between the capacitors (e.g., the parasitics of the capacitors) may result in gain and offset errors between row readouts. As a result, there may be a row fixed pattern noise in the output image that repeats every three rows.

To reduce or eliminate the row fixed pattern noise, the row selection may be dithered during readout. In other words, the rows may be read out in a randomized fashion, rather than sequentially. Therefore, any repeat cycle of the fixed pattern noise may be larger (e.g., larger than every three rows) and less visible to a viewer of the output image, or the fixed pattern noise may be eliminated. An illustrative example of a camera module that includes row randomization circuitry to reduce or eliminate fixed pattern noise is shown in FIG. 3.

Figure 3:
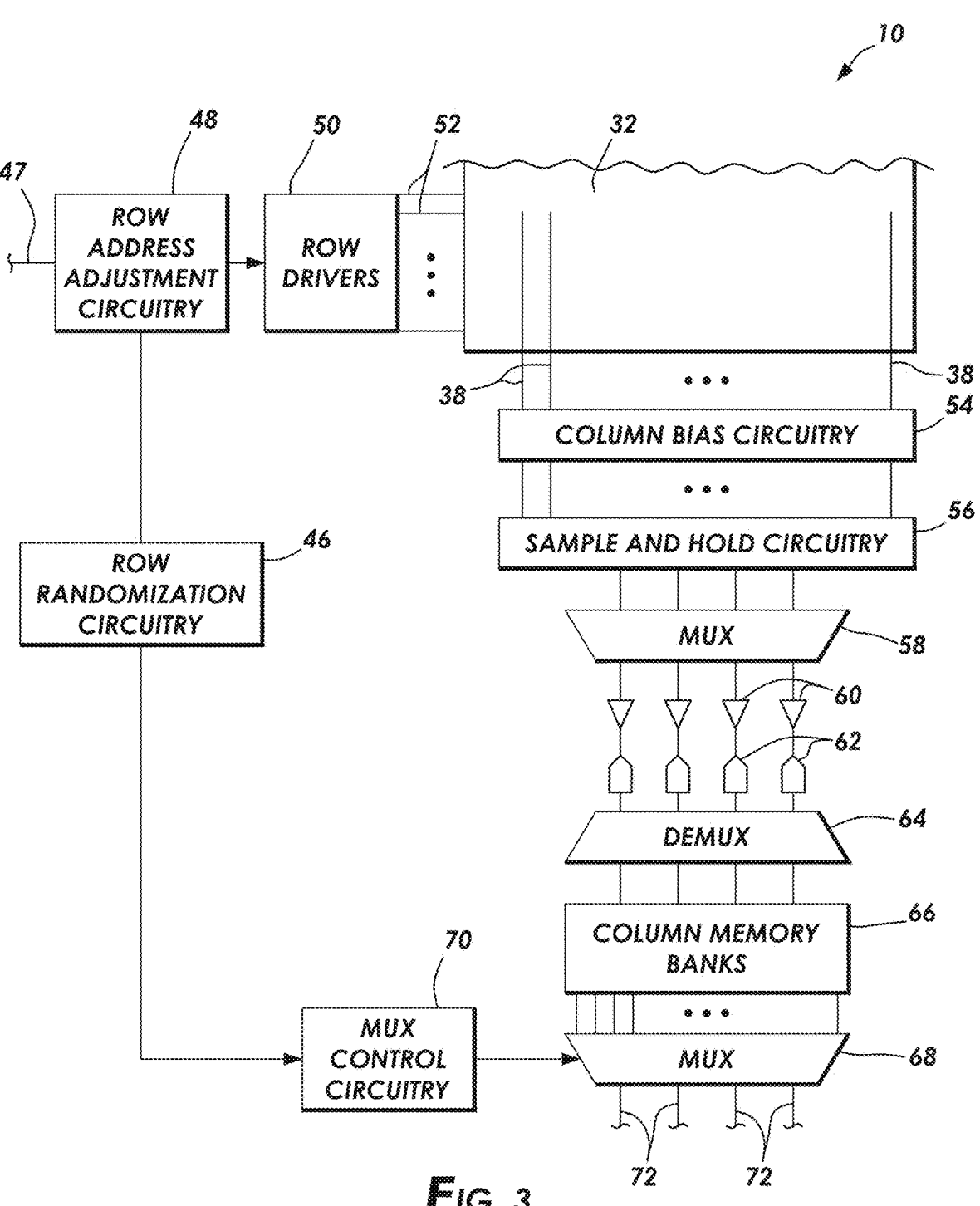
FIG. 3 is a diagram of an illustrative imaging system including row randomization circuitry coupled to row drivers and the image sensor in accordance with some embodiments.

As shown in FIG. 3, imaging system 10 may include row randomization circuitry 46. Row randomization circuitry 46 may be coupled to row address adjustment circuitry 48, which may also receive row address 47 (e.g., from control and processing circuitry 44 of FIG. 2). Row drivers 50 may be coupled to row address adjustment circuitry 48 and to the rows of pixel array 32 over lines 52.

Columns of pixel array 32 may be coupled to column lines 38. Column lines 38 may be coupled to column bias circuitry 54, which in turn may be coupled to sample and hold circuitry 56. Sample and hold circuitry 56 may be coupled to multiplexer (MUX) 58. The outputs of MUX 58 may be coupled to amplifiers 60 and analog-to-digital converters (ADCs) 62. The output of ADCs 62 may be coupled to de-multiplexer (DEMUX) 64, and the output of DEMUX 64 may be coupled to column memory banks 66.

Column memory banks 66 may be coupled to MUX 68. Row randomization circuitry 46 may also be coupled to MUX 68 over MUX control circuitry 70. Output 72 of MUX 68 may be digital signals that correspond to the signals generated by pixel array 32, and output 72 may be output to a digital data path (e.g., path 18 of FIG. 1 or another suitable data path).

Although not shown in FIG. 3, pixel array 32 may be read out over cut columns. In other words, column lines 38 may carry the output of half of array 32 (e.g., the lower half of array 32). A second set of column lines, column bias circuitry, sample and hold circuitry, MUX, amplifiers, ADCs, DEMUX, column memory banks, and MUX may be used to read out the output from the other half of array 32 (e.g., the upper half of array 32). However, this is merely illustrative. In some embodiments, column lines 38 may carry the output of the entire output of array 32. Alternatively, column lines 38 may carry the output of a quarter of array 32, and three additional sets of column lines, column bias circuitry, sample and hold circuitry, MUX, amplifiers, ADCs, DEMUX, column memory banks, and MUX may be used to read out the outputs from the other quarters of array 32. In general, array 32 may be split into any desired number of portions that are read out with sets of column lines, column bias circuitry, sample and hold circuitry, MUX, amplifiers, ADCs, DEMUX, column memory banks, and MUX.

In operation, row randomization circuitry 46 may generate random codes (e.g., pseudorandom codes) on a per-frame basis (or at another suitable interval). In some embodiments, for example, row randomization circuitry 46 may be a pseudorandom binary sequence (PRBS) generator. The random code may be input to row address adjustment circuitry 48 along with row address 47. Based on the random code, row address adjustment circuitry 48 may dither the row address (e.g., dither the original value of row address 47). The random code generated by row randomization circuitry 46, and therefore the dithering performed by row address adjustment circuitry 48, may be a suitable length so that it does not repeat on a per-frame basis. For example, the random code and the dithering may have a length of at least 10 least-significant bits (LSBs), at least 15 LSBs, at least 20 LSBs, between 10 and 30 LSBs, or another suitable length. Row randomization circuitry 46 may randomize all of the rows in sets of two rows (e.g., two sequential rows), sets of four rows (e.g., four sequential rows), sets of eight rows (e.g., eight sequential rows), or sets of 16 rows (e.g., 16 sequential rows), as examples. However, this is merely illustrative. The dithering may be repeated within an image frame, if desired. In general, the dithering of the row addresses may be long enough to avoid a short row fixed noise pattern.

The dithered row addresses may be provided to row drivers 50, which in turn may select the rows for readout over lines 52. In other words, row drivers 50 may address the rows of array 32 based on the row addresses. Because of the dithered row addresses provided to row drivers 50, the readout will be dithered.

The output of the pixels of array 32 may be read out over column lines 38 (e.g., with the rows of the columns randomized based on the dithered row addresses) and may be passed through column bias circuitry 54, which may supply bias signals (e.g., bias currents or bias voltages) to the signals. The output of column bias circuitry 54 may pass to sample and hold circuitry 56. Sample and hold circuitry 56 may include a plurality of capacitors for even and odd columns of column lines 38, along with shared amplifiers and ADCs for multiple column lines 38. The capacitors in sample and hold circuitry 56 may sample and store the output of the pixels of array 32. An illustrative example of sample and hold circuitry 56 is shown in FIG. 4.

Figure 4:
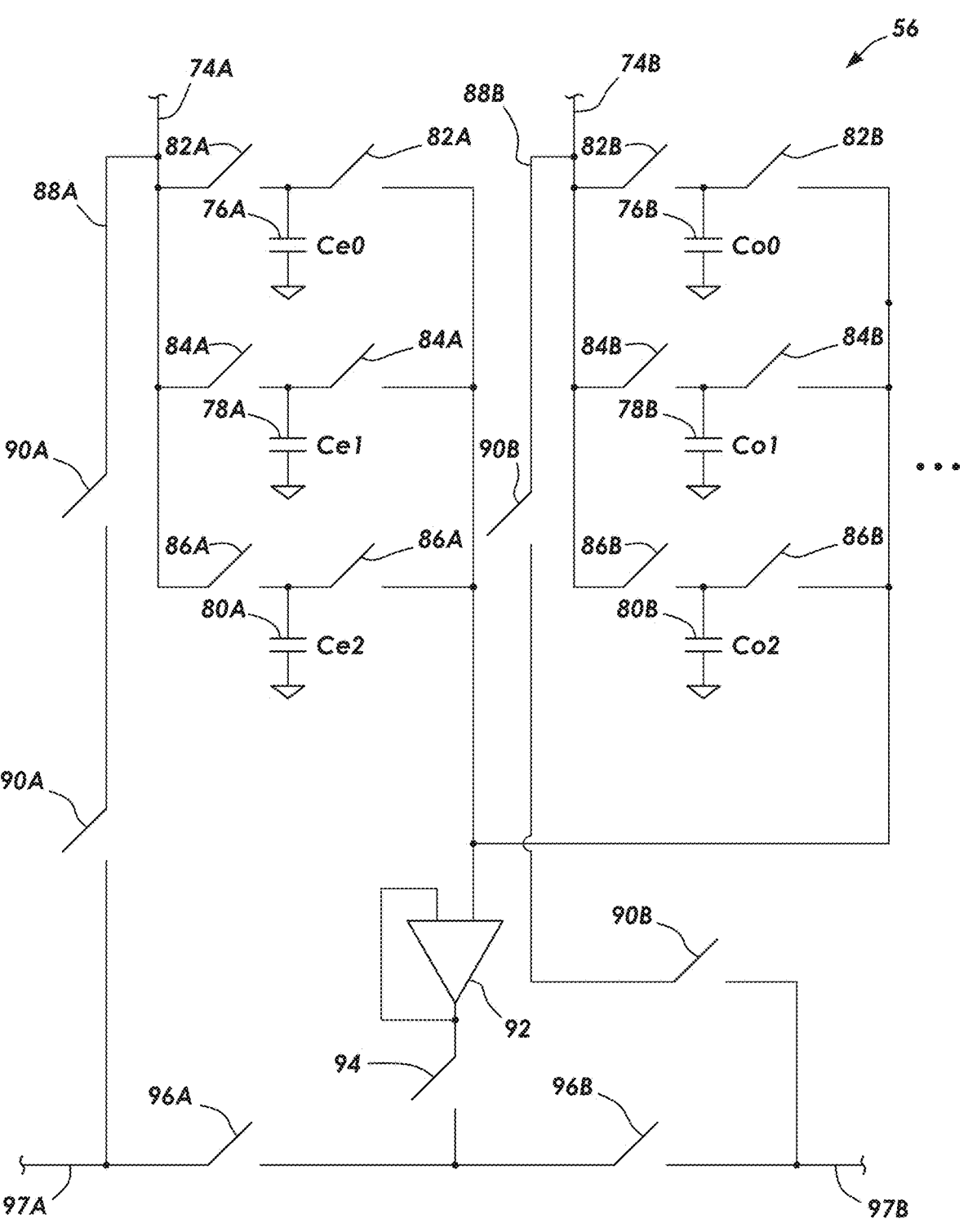
FIG. 4 is a diagram of illustrative sample and hold circuitry for an imaging system in accordance with some embodiments.

As shown in FIG. 4, a portion of sample and hold circuitry 56 may receive inputs along column line 74A from a first column (e.g., an even column) of array 32 and may receive inputs along column line 74B from a second column (e.g., an odd column) of array 32. Column line 74A may be coupled to three capacitors: capacitor Ce0 76A, capacitor Ce1 78A, and capacitor Ce2 80A. Switches 82A, 84A, and 86A may control the sample and hold operations of capacitor Ce0 76A, capacitor Ce1 78A, and capacitor Ce2 80A, respectively.

Similarly, column line 74B may be coupled to three capacitors: capacitor Co0 76B, capacitor Co1 78B, and capacitor Co2 80B. Switches 82B, 84B, and 86B may control the sample and hold operations of capacitor Co0 76B, capacitor Co1 78B, and capacitor Co2 80B, respectively.

The outputs of capacitors 76, 78, and 80 may be coupled to amplifier 92, which in turn may be coupled to switch 94, and to output lines 97A and 97B through switches 96A and 96B respectively. Bottom plates of capacitors 76, 78, and 80 may be coupled to ground.

Sample and hold circuitry 56 may also include bypass lines 88A and 88B coupled to column lines 74A and 74B, respectively. Each bypass line 88A and 88B may include one or more respective switches, such as switches 90A and 90B, and may be coupled to output lines 97A and 97B.

In operation, sample and hold circuitry 56 may sample and hold row readouts for the column associated with column line 74A and the column associated with column line 74B. In particular, for each row that is read out, each capacitor 76, 78, and 80 may hold one of a pre-sampled signal, a reset value, or a signal associated with the reset in the same row or the reset from the next row. Sample and hold circuitry 56 may cycle through using each capacitor 76, 78, and 80 for each of the pre-sampled signal, the reset value, and the signal associated with the reset of the current row or the reset from the next row. In some embodiments, this cycle (e.g., pattern) may be repeated every three rows within a given image frame.

Sample and hold circuitry 56 may include the portion shown in FIG. 4 for each set of two columns (e.g., for each set of odd and even columns) of array 32. However, having shared sample and hold circuitry 56 between each odd and even column of array 32 is merely illustrative. In some embodiments, for example, sample and hold circuitry 56 may be shared between four columns, at least one column, at least two columns, or any other suitable number of columns, with three (or more) capacitors per column. Moreover, sample and hold circuitry 56 may be duplicated for the top portion of array 32 if array 32 has a cut.

Although FIG. 4 shows sample and hold circuitry 56 having three capacitors for each column of array 32, this is merely illustrative. In some embodiments, sample and hold circuitry 56 may have at least two capacitors, at least three capacitors, at least four capacitors, or at least five capacitors for each column, as examples.

Returning to FIG. 3, the output of sample and hold circuitry 56 may be passed to MUX 58, which may multiplex the output of sample and hold circuitry 56. For example, output lines 97A and 97B of sample and hold circuitry 56 (FIG. 4) may be passed through MUX 58 to a single amplifier 60 and ADC 62. The multiplexed output may be amplified by amplifiers 60 and converted from analog to digital signals by ADCs 62. DEMUX 64 may then de-multiplex the digital signals from ADCs 62.

Column memory banks 66 may store the digital signals. For example, column memory banks 66 may include four banks of column memory to store four rows of digital signals or eight banks of column memory to store eight rows of digital signals, as examples. In general, column memory banks 66 may include any suitable number of banks of column memory, such as at least two banks, at least 3 banks, at least 4 banks, at least 8 banks, or another suitable number of column memory banks. In some embodiments, the number of column memory banks 66 may correspond with the number of rows that are randomized by row randomization circuitry 46 (e.g., a set of four rows, a set of eight rows, or a set of 16 rows, as examples).

The storage of column memory banks 66 may be selected by multiplexer (MUX) control circuitry 70 (through MUX 68) in response to signals from row randomization circuitry 46. In particular, MUX control circuitry 70 may control MUX 68 to read out signals from column memory banks 66 based on the dithered row addresses from row randomization circuitry 46. In other words, row randomization circuitry may control MUX 68 to read out the correct signals from column memory banks 66 for the current dithered row (e.g., the signals from column memory banks 66 may be read out with the rows de-randomized in each column based on the input from row randomization circuitry 46). The output of MUX 68 may be read out over output lines 72 to a digital data path.

By randomizing the outputs of rows of pixel array 32, any row noise caused by the sequential readout of sample and hold circuitry 56 (e.g., row noise that repeats every three rows due to the sets of three capacitors in sample and hold circuitry 56) may not be repeated (or may be reduced) in the resulting output image. In other words, even if there is some noise due to the non-idealities of capacitors 76, 78, and 80 (FIG. 4), the noise will not appear in a fixed pattern in the output image due to the randomization of the row readout. The randomization may also correct for mismatches between column circuitry, therefore reducing or eliminating column fixed pattern noise.

Although FIG. 3 has shown and described randomizing the row readout using dithering with row randomization circuitry 46, this is merely illustrative. In some embodiments, a counter, a shift register with a randomized pattern, or other suitable randomizer may be used to randomize the row readouts and reduce or eliminate the row fixed pattern noise.

Although FIG. 3 shows imaging system 10 including MUX 58 coupled to amplifiers 60 coupled to ADCs 62, coupled to DEMUX 64, this arrangement is merely illustrative. In some embodiments, MUX 58 and DEMUX 64 may be omitted from imaging system 10. Alternatively, MUX 58 may be incorporated between array 32 and sample and hold circuitry 56. In general, imaging system 10 may include any suitable readout components that are arranged in any suitable order.

Although FIG. 3 shows imaging system 10 with row randomization circuitry 46 to randomize the outputs of rows within pixel array 32 and reduce or eliminate row fixed pattern noise, this is merely illustrative. If desired, the outputs of columns within pixel array 32 may be randomized instead of, or in addition to, the outputs of the rows to reduce or eliminate column fixed pattern nose.

In some embodiments, odd and even rows of array 32 may be required to be read out sequentially. In these embodiments the row readout may be dithered (e.g., two rows may be dithered at a time).

If desired, other correction methods may be performed in addition to the randomization of the row readouts. For example, black level correction (offset) and/or sample and hold calibration (e.g., gain and offset) may be performed simultaneously with the randomization of the row readouts.

The randomization of row readouts may be disabled and enabled as desired during the readout of array 32 or between readouts of array 32. For example, row randomization circuitry 46 may be controlled (e.g., by control and processing circuitry 44 of FIG. 2) and may be switched to a mode in which row addresses 47 are not dithered.

Instead of, or in addition to, randomizing the row readouts of array 32, the sample and hold circuitry capacitor cycling may be randomized (e.g., pseudorandomized) to reduce or eliminate fixed pattern noise. An illustrative example of an imaging system with a sample and hold circuitry controller to randomize the sample and hold cycling is shown in FIG. 5.

Figure 5:
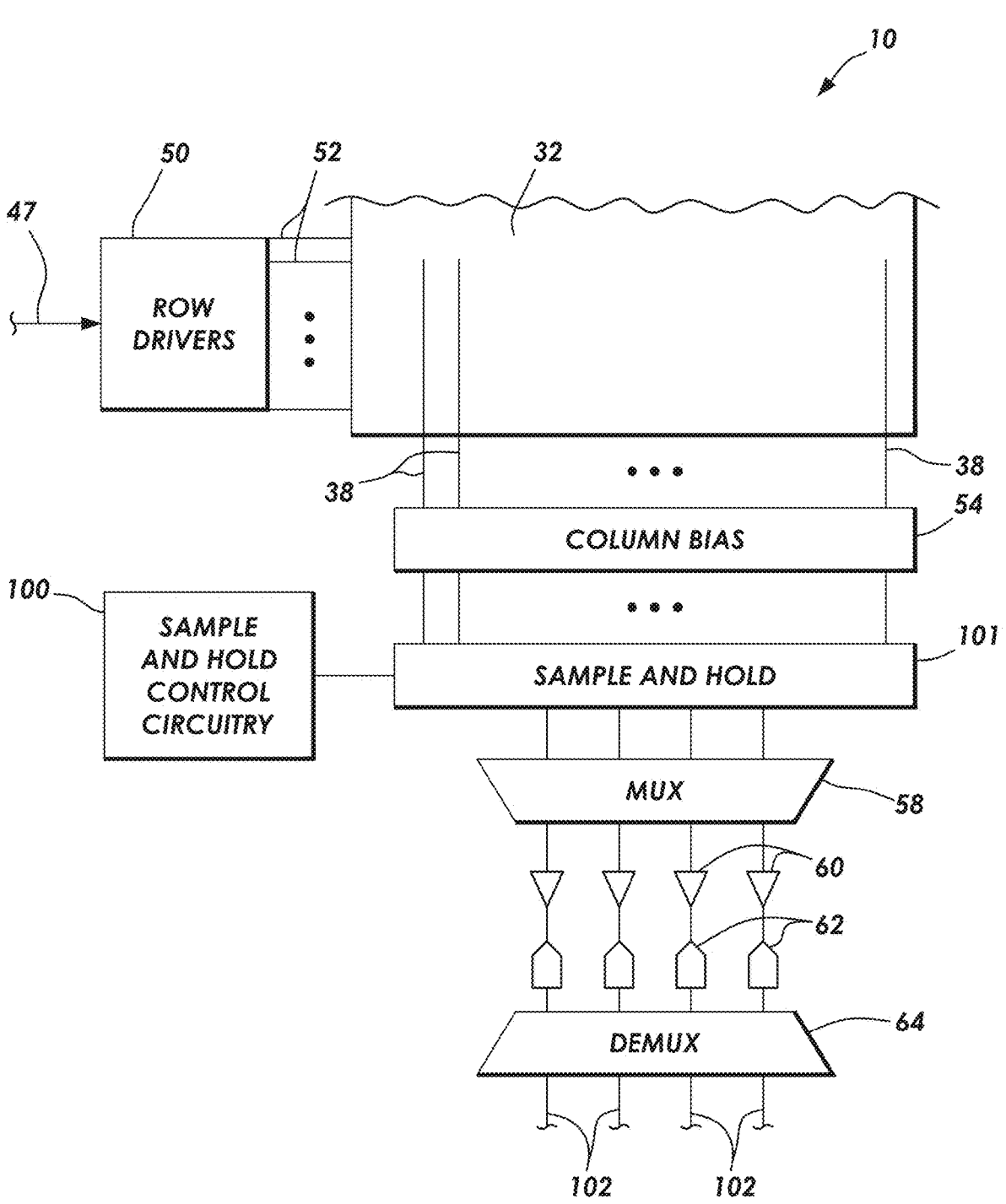
FIG. 5 is a diagram of an illustrative imaging system including sample and hold control circuitry that is configured to randomize a pattern of capacitors used to sample and hold pixel signals in accordance with some embodiments.

As shown in FIG. 5, imaging system 10 may include sample and hold control circuitry 100 coupled to sample and hold circuitry 101. Imaging system 10 may have outputs 102 directly from DEMUX 64, or imaging system 10 may have column memory banks 66 between DEMUX 64 and outputs 102, as shown in FIG. 3.

Sample and hold control circuitry 100 may randomly (e.g., pseudorandomly) change the capacitor cycling of sample and hold circuitry 101 on a frame-by-frame basis (or at another suitable interval). In particular, sample and hold circuitry 101 may include capacitors on which signals from column lines 38 are sampled and stored. An illustrative example of a portion of sample and hold circuitry 101 is shown in FIG. 6.

Figure 6:
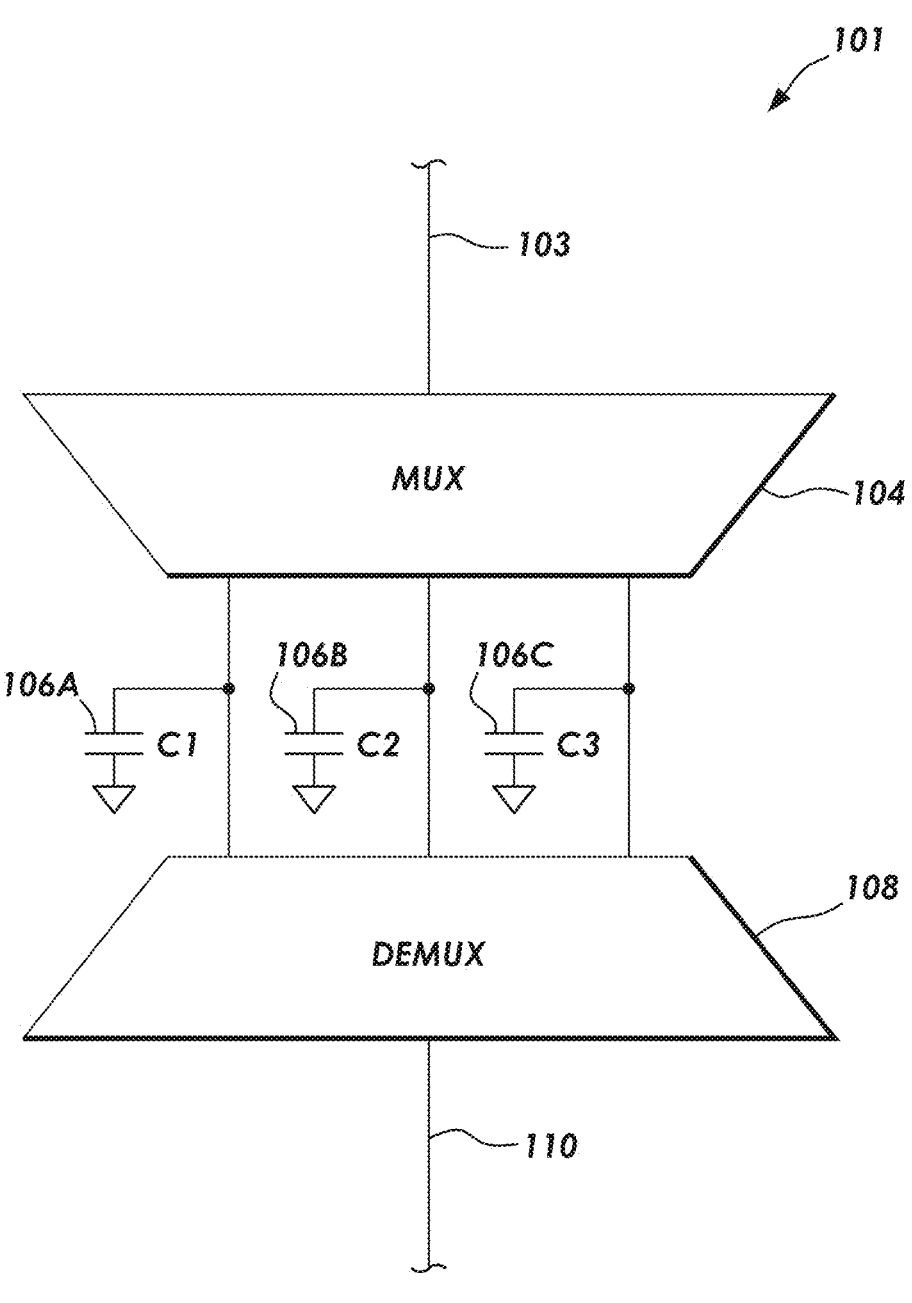
FIG. 6 is a diagram of illustrative sample and hold circuitry with capacitors that may sample and hold pixel signals in a randomized pattern in accordance with some embodiments.

As shown in FIG. 6, sample and hold circuitry 101 may include input 103 coupled to multiplexer (MUX) 104. Input 103 may be coupled to one or more column lines 38 (FIG. 5). For example, input 103 may be coupled to one column line 38 (e.g., an odd column line or an even column line). Although not shown in FIG. 6, sample and hold circuitry 101 may include six (or more) total capacitors, three (or more) for each column line 38 (e.g., as shown in FIG. 4). In these embodiments, sample and hold circuitry 101 may have portions shared across column output lines 38 (e.g., shared between odd and even column output lines 38, as shown in FIG. 4).

MUX 104 may be coupled to capacitors C1 106A, C2 106B, and C3, 106C, which in turn may be coupled to DEMUX 108. Bottom plates of capacitors C1 106A, C2 106B, and C3, 106C may be coupled to ground. An output of DEMUX 108 may be coupled to output line 110.

After being multiplexed using MUX 104, signals received over input line 103 may pass to one or more of capacitor C1 106A, capacitor C2 106B, and/or capacitor C3 106C. In particular, two of capacitors C1 106A, C2 106B, and C3

106C may hold pre-sampled signal and reset values while the remaining capacitor is sampling either the signal associated with the reset in the current row or the reset from the next row. If the use of capacitors used for the reset and signal values is repeated (e.g., every three rows) along with the row readouts being repeated, a row fixed pattern noise will be seen in the output image. Therefore, the use of the capacitors 106 may be randomly (e.g., pseudorandomly) varied on a frame-by-frame basis (or another suitable basis) to reduce or eliminate the fixed pattern noise. An illustrative example of varying the use of capacitors 106 is shown in the chart of FIG. 7.

As shown in FIG. 7, in frame M, the reset (R) of row N may be stored on capacitor C3 106C, while the signal(S) of row N may be stored on capacitor C1 106A. The reset of row N+1 may be stored on capacitor C2 106B, while the signal of row N+1 may be stored on capacitor C3 106C. The reset of row N+2 may be stored on capacitor C1 106A, while the signal of row N+2 may be stored on capacitor C2 106B. The reset of row N+3 may be stored on capacitor C3 106C, while the signal of row N+3 may be stored on capacitor C1 106A. The reset of row N+4 may be stored on capacitor C2 106B, while the signal of row N+4 may be stored on capacitor C3 106C. The reset of row N+5 may be stored on capacitor C1 106A, while the signal of row N+5 may be stored on capacitor C2 106B. This pattern may be continued for each row N of frame M. In other words, the capacitors 106 on which the reset and signal values are stored in frame M may be varied between each row N, and the pattern may be repeated every three rows.

Relative to frame M, the capacitor on which the signal and reset values for each row of frame M+1 may be varied randomly (e.g., pseudorandomly). In the example of FIG. 7, in frame M+1, the reset of row N may be stored on capacitor C2 106B, while the signal of row N may be stored on capacitor C1 106A. The reset of row N+1 may be stored on capacitor C3 106C, while the signal of row N+1 may be stored on capacitor C2 106B. The reset of row N+2 may be stored on capacitor C1 106A, while the signal of row N+2 may be stored on capacitor C3 106C. The reset of row N+3 may be stored on capacitor C2 106B, while the signal of row N+3 may be stored on capacitor C1 106A. The reset of row N+4 may be stored on capacitor C3 106C, while the signal of row N+4 may be stored on capacitor C2 106B. The reset of row N+5 may be stored on capacitor C1 106A, while the signal of row N+5 may be stored on capacitor C3 106C. This pattern may be continued for each row N of frame M+1. In other words, the capacitors 106 on which the reset and signal values are stored in frame M+1 may be varied between each row N, and the pattern may be repeated every three rows. However, relative to the pattern of the capacitors used in frame M, the pattern of frame M+1 may be varied randomly (e.g., pseudorandomly).

Similarly, relative to frames M and M+1, the capacitor on which the signal and reset values for each row of frame M+2 may be varied randomly (e.g., pseudorandomly). In the example of FIG. 7, in frame M+2, the reset of row N may be stored on capacitor C3 106C, while the signal of row N may be stored on capacitor C2 106B. The reset of row N+1 may be stored on capacitor C1 106A, while the signal of row N+1 may be stored on capacitor C3 106C. The reset of row N+2 may be stored on capacitor C2 106B, while the signal of row N+2 may be stored on capacitor C1 106A. The reset of row N+3 may be stored on capacitor C3 106C, while the signal of row N+3 may be stored on capacitor C2 106B. The reset of row N+4 may be stored on capacitor C1 106A, while the signal of row N+4 may be stored on capacitor C3 106C.

The reset of row N+5 may be stored on capacitor C2 106B, while the signal of row N+5 may be stored on capacitor C1 106A. This pattern may be continued for each row N of frame M+2. In other words, the capacitors 106 on which the reset and signal values are stored in frame M+2 may be varied between each row N, and the pattern may be repeated every three rows. However, relative to the pattern of the capacitors used in frames M and M+1, the pattern of frame M+2 may be varied randomly (e.g., pseudorandomly).

The pattern of capacitors used to store the signal and reset values in each row may be varied randomly (e.g., pseudorandomly) between each frame. By varying the pattern between each frame, the row fixed pattern noise that would otherwise be caused by the pattern of using capacitors C1, C2, and C3 in a rotational pattern (e.g., the same pattern for each frame) may be reduced or eliminated. In particular, as shown in FIG. 7, the delta between the row and signal values for row N of frame M is dC1-dC3, the delta for row N of frame M+1 is dC1-dC2, and the delta for row N of frame M+2 is dC2-dC3. Adding up these deltas gives a multi-frame average of zero. This is true for all of the rows shown in FIG. 7. In other words, by randomly varying the capacitor storage pattern between image frames, the row fixed pattern noise may be reduced or eliminated. In some embodiments, for example, the fixed pattern noise may be reduced below thermal/temporal noise, such as below 20 dB. However, this is merely illustrative. In general, the fixed pattern noise may be reduced below any suitable threshold.

Returning to FIG. 6, MUX 104 and DEMUX 108 may be used to randomize the capacitor pattern between frames. In particular, MUX 104 may multiplex the signal and reset to capacitors 106, and DEMUX 108 may demultiplex the signal and reset, which may be passed to output 110.

Although FIGS. 6 and 7 show and describe sample and hold circuitry 101 including three capacitors 106 for a single column line, this is merely illustrative. In some embodiments, sample and hold circuitry may include more capacitors, such as four or five capacitors, per column line. Therefore, the randomization of the use of the capacitors between frames may be increased, further reducing the fixed pattern row noise.

Although FIGS. 6 and 7 show and describe randomizing the capacitor storage pattern in sample and hold circuitry 101 to reduce or eliminate row fixed pattern noise, this is merely illustrative. If desired, capacitors used to store the outputs of columns within pixel array 32 may be randomized instead of, or in addition to, the outputs of the rows to reduce or eliminate column fixed pattern nose.

In some embodiments, the row randomization of FIG. 3 (with the associated sample and hold circuitry 56 of FIG. 4) may be combined with the capacitor pattern randomization of FIGS. 5 and 6. In other words, a single imaging system 10 may include row randomization circuitry 46, row address adjustment circuitry 48, and MUX control circuitry 70 (FIG. 3) and sample and hold control circuitry 100 (FIG. 5). In this way, the fixed pattern noise may be further reduced.

The foregoing is merely illustrative and various modifications can be made to the described embodiments. The foregoing embodiments may be implemented individually or in any combination.

What is claimed is:

1. An imaging system, comprising:
an image sensor comprising an array of pixels arranged in rows and columns;
row drivers coupled to the array of pixels, wherein the row drivers are configured to address rows of the array of pixels based on row addresses;

row randomization circuitry coupled to the row drivers, wherein the row randomization circuitry is configured to dither the row addresses; and column lines coupled to the columns of the array of pixels, wherein signals from the array of pixels are configured to be read out over the column lines based on the dithered row addresses.

2. The imaging system of claim 1, further comprising:

column memory banks coupled to the column lines;

a multiplexer coupled to an output of the column memory banks; and multiplexer control circuitry coupled between the multiplexer and the row randomization circuitry, wherein the multiplexer control circuitry is configured to control the multiplexer to read out the signals based on the dithered row addresses.

3. The imaging system of claim 2, further comprising:

sample and hold circuitry coupled to the column lines between the array of pixels and the column memory banks, wherein the sample and hold circuitry comprises at least three capacitors coupled to each of the column lines.

4. The imaging system of claim 3, wherein the column memory banks comprise four banks of column memory.

5. The imaging system of claim 4, further comprising:

amplifiers coupled to the sample and hold circuitry; and analog to digital converters coupled to the amplifiers, wherein each of the amplifiers and each of the analog to digital converters are shared between two of the column lines.

6. The imaging system of claim 1, wherein the row randomization circuitry comprises a pseudorandom binary sequence generator.

7. The imaging system of claim 6, further comprising:

row address adjustment circuitry that is configured to dither the row addresses based on random codes generated by the pseudorandom binary sequence generator.

8. The imaging system of claim 1, wherein the row randomization circuitry is configured to randomize an order in which the rows of every set of four rows are read out.

9. The imaging system of claim 1, further comprising:

sample and hold circuitry coupled to the column lines, wherein the sample and hold circuitry comprises at least three capacitors configured to store the signals and reset values for each of the column lines; and sample and hold control circuitry coupled to the sample and hold circuitry, wherein the sample and hold control circuitry is configured to randomize a pattern in which the at least three capacitors are used to store the signals and the reset values on a frame-by-frame basis.

10. The imaging system of claim 9, wherein the pattern in which the at least three capacitors are used to store the signals and the reset values is configured to repeat every three rows within a given image frame.

11. An imaging system, comprising:

an image sensor comprising an array of pixels arranged in rows and columns;

column lines coupled to the columns of the array of pixels, wherein signals from the array of pixels are configured to be read out over the column lines;

sample and hold circuitry coupled to the column lines, wherein the sample and hold circuitry comprises at least three capacitors configured to store the signals and reset values for each of the column lines; and sample and hold control circuitry coupled to the sample and hold circuitry, wherein the sample and hold circuitry is configured to randomize a pattern in which the at least three capacitors are used to store the signals and the reset values on a frame-by-frame basis.

12. The imaging system of claim 11, wherein the sample and hold control circuitry is configured to randomize the pattern in which the at least three capacitors are used to store the signals and the reset values pseudorandomly.

13. The imaging system of claim 11, wherein the sample and hold circuitry comprises at least four capacitors configured to store the signals and the reset values for each of the column lines, and the sample and hold circuitry is configured to randomize a pattern in which the at least four capacitors are used to store the signals and the reset values on a frame-by-frame basis.

14. The imaging system of claim 11, further comprising:

row driver circuitry coupled to the array of pixels, wherein the row driver circuitry is configured to address rows of the array of pixels based on row addresses; and row randomization circuitry coupled to the row driver circuitry, wherein the row randomization circuitry is configured to dither the row addresses, and the signals from the array of pixels are configured to be read out over the column lines based on the dithered row addresses.

15. The imaging system of claim 14, further comprising:

column memory banks coupled to the column lines;

a multiplexer coupled to an output of the column memory banks; and multiplexer control circuitry coupled between the multiplexer and the row randomization circuitry, wherein the multiplexer control circuitry is configured to control the multiplexer to read out the signals based on the dithered row addresses.

16. A method of operating an image sensor comprising an array of pixels arranged in rows and columns, the method comprising:

reading out signals from a given column of the array of pixels with the rows of the given column randomized;

sampling and holding the signals;

storing the signals in column memory banks; and reading out the signals from the column memory banks with the rows of the given column de-randomized.

17. The method of claim 16, further comprising:

with row randomization circuitry, dithering row addresses used to address the rows of the array of pixels to randomize the rows of the given column.

18. The method of claim 17, further comprising:

with the row randomization circuitry, controlling the reading out of the signals from the column memory banks.

19. The method of claim 17, wherein sampling and holding the signals comprises sampling and holding the signals from the given column and reset values for the given column on at least three capacitors.

20. The method of claim 19, further comprising:

randomizing a pattern in which the at least three capacitors are used to store the signals and the reset values on a frame-by-frame basis.

* * * * *